United States Patent [19]
Robinson

[11] 4,245,522
[45] Jan. 20, 1981

[54] BICYCLE STEERING AND CONTROL MEMBER

[76] Inventor: Merritt A. Robinson, 475 Fawn Dr., San Anselmo, Calif. 94960

[21] Appl. No.: 48,271

[22] Filed: Jun. 13, 1979

[51] Int. Cl.³ .............. G05G 11/00; B62K 23/06; B62K 21/12
[52] U.S. Cl. .................. 74/480 R; 74/489; 74/551.1
[58] Field of Search .............. 74/480 R, 488, 489, 74/551.1

[56] References Cited
U.S. PATENT DOCUMENTS

| 581,038 | 4/1897 | Ranney | 74/489 X |
|---|---|---|---|
| 4,026,165 | 5/1977 | Papp | 74/551.1 |

FOREIGN PATENT DOCUMENTS

| 638790 | 6/1928 | France | 74/551.1 |
| 886661 | 10/1943 | France | 74/551.1 |

Primary Examiner—Allan D. Herrmann
Attorney, Agent, or Firm—James R. Cypher

[57] ABSTRACT

A steering and control member including a cross member adapted for connection to a stem member, a pair of hand-grip-control members each formed from at least two molded members joined to one another, and each control member including an upper hand grip member connected to the cross member, a lower hand grip member spaced below the upper hand grip member and a control housing member connected to the upper and lower hand grip members.

11 Claims, 41 Drawing Figures

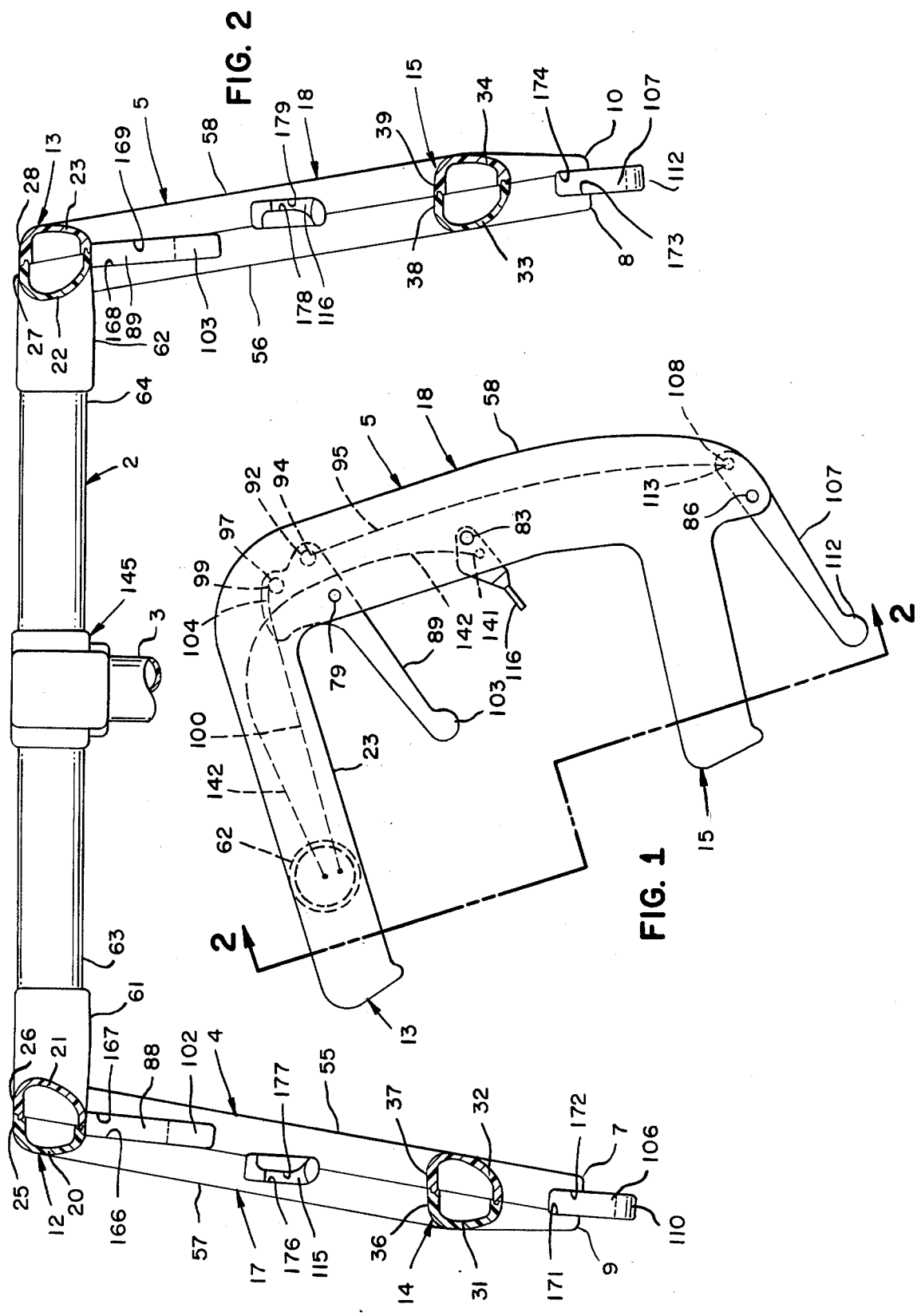

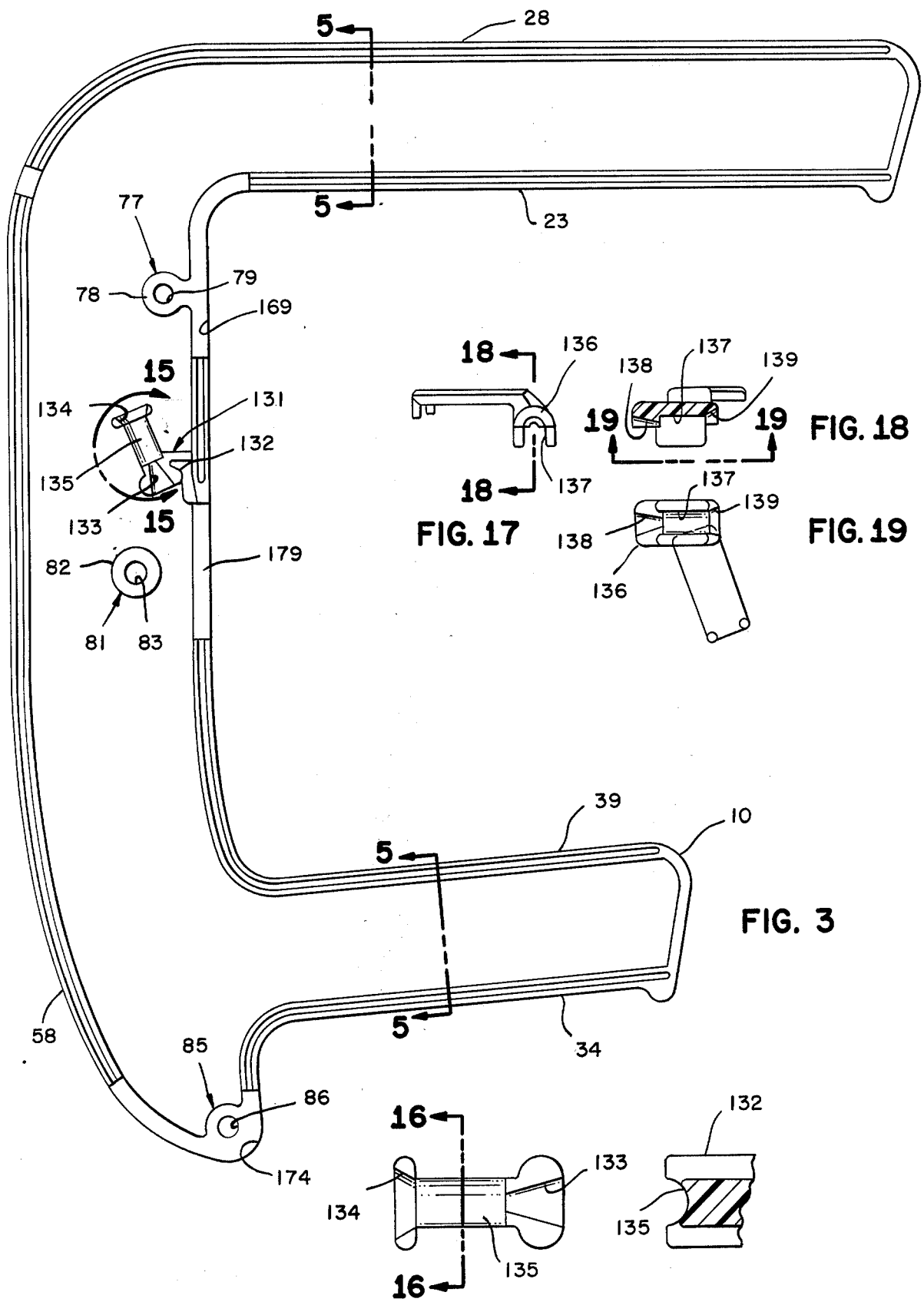

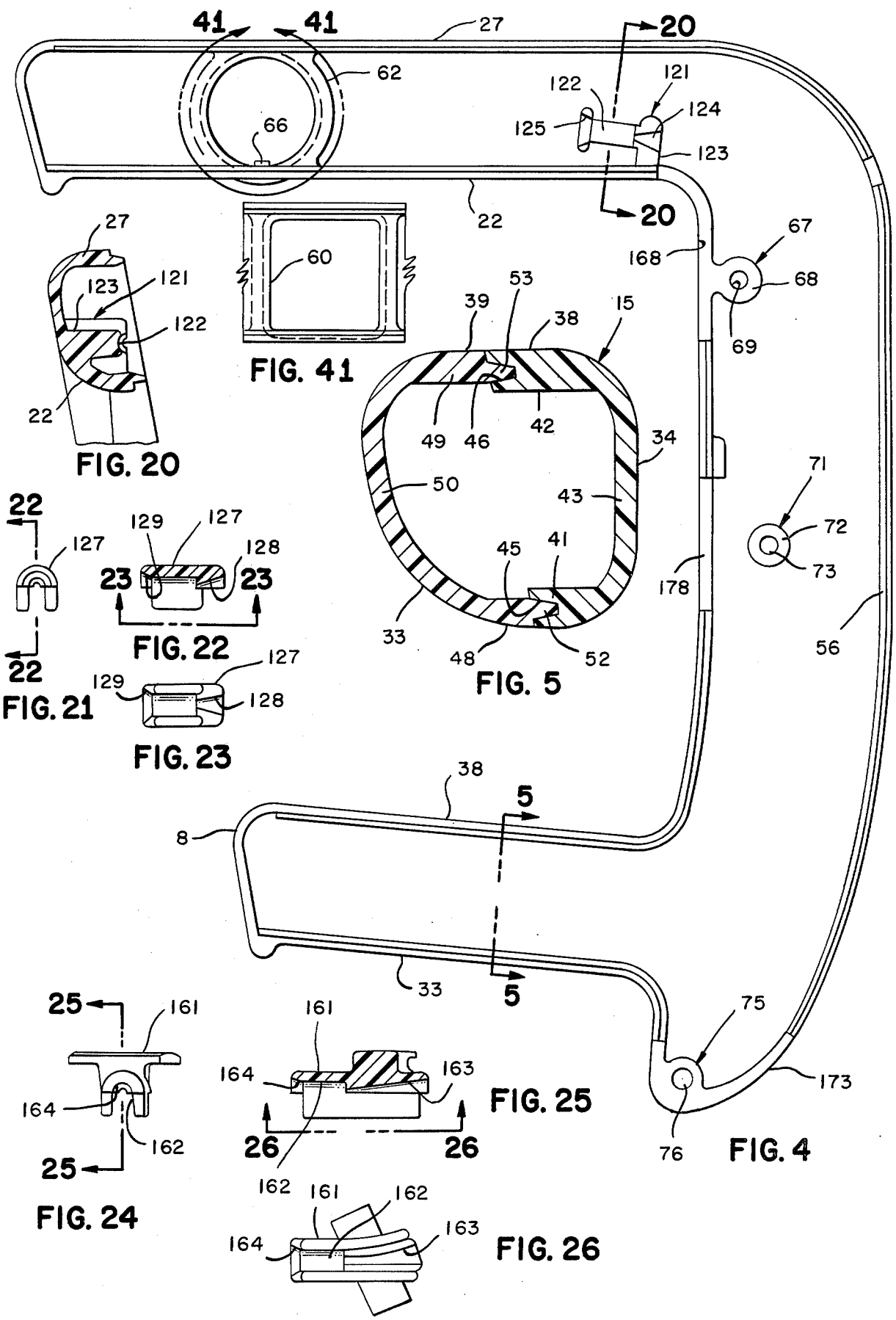

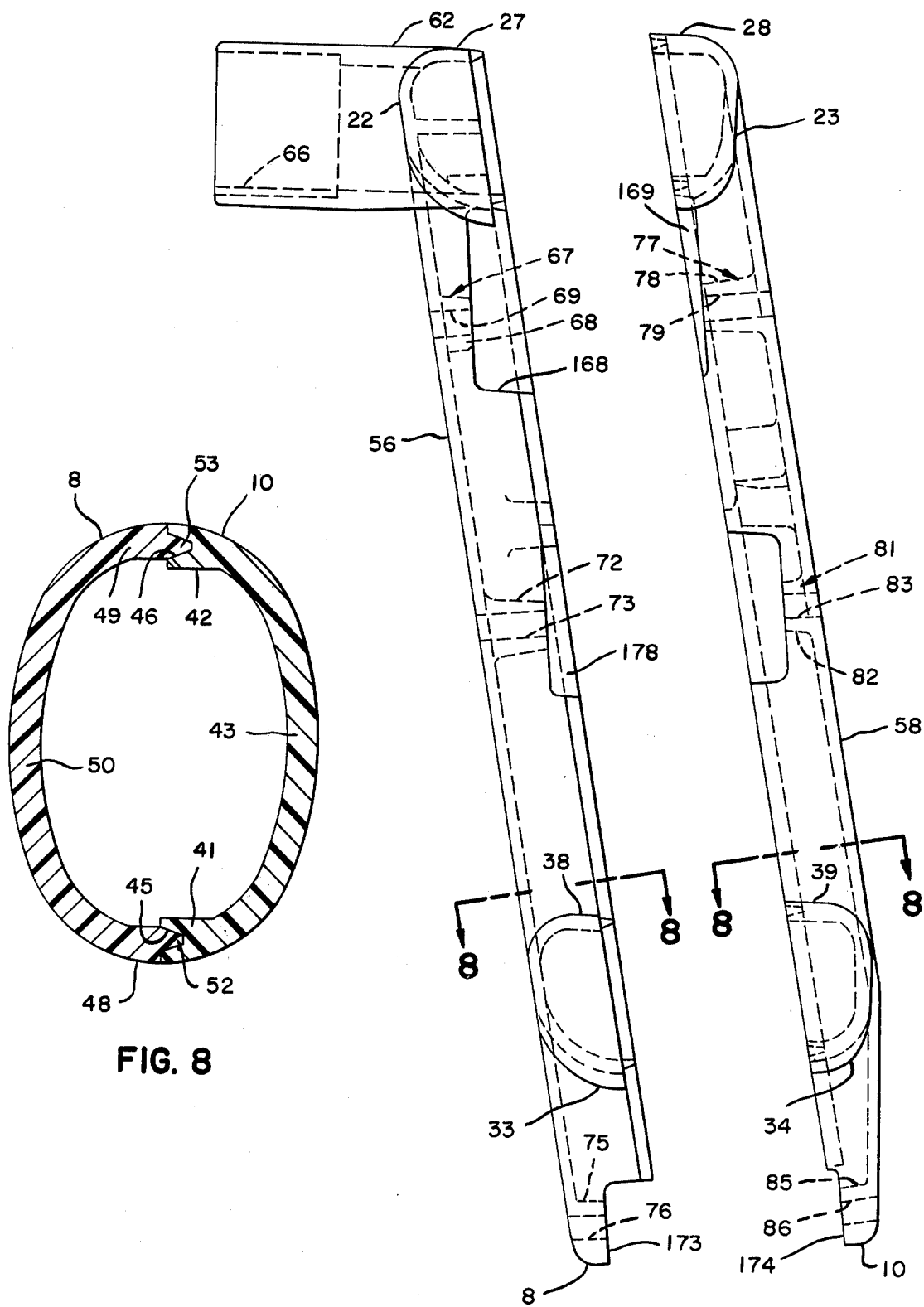

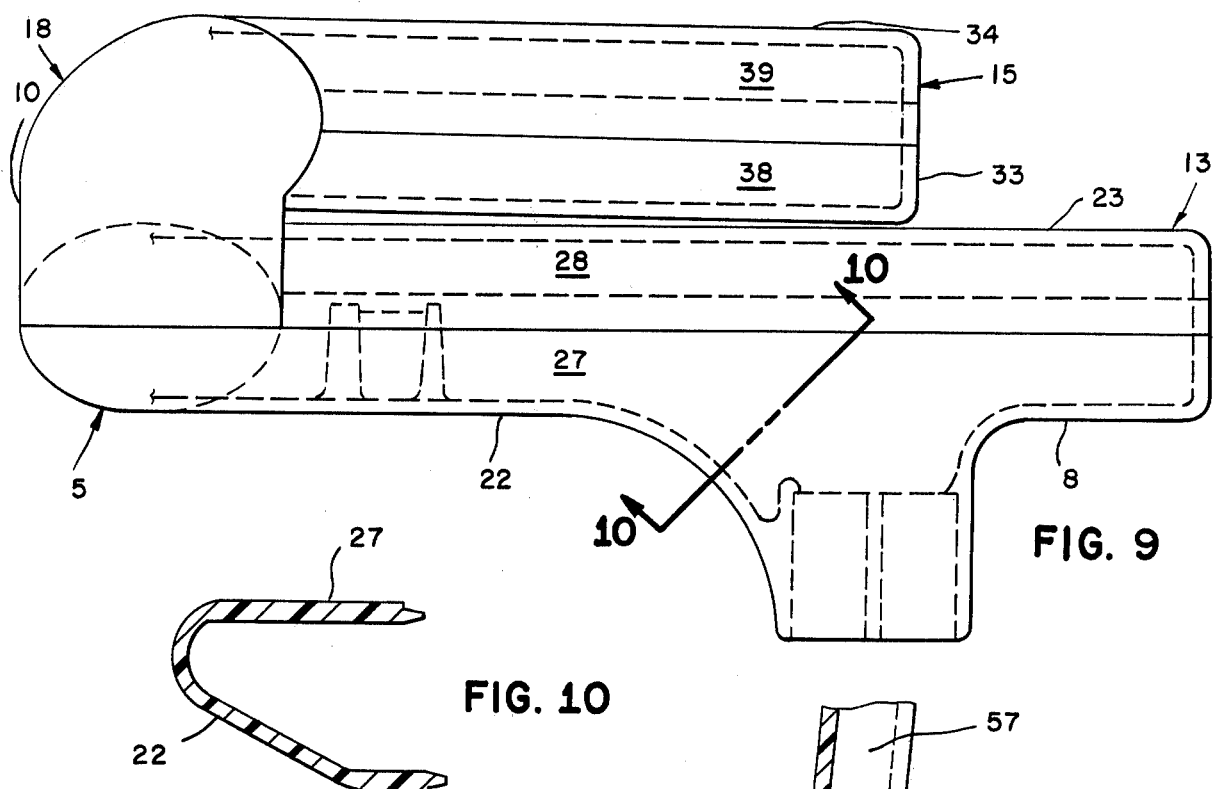
FIG. 9
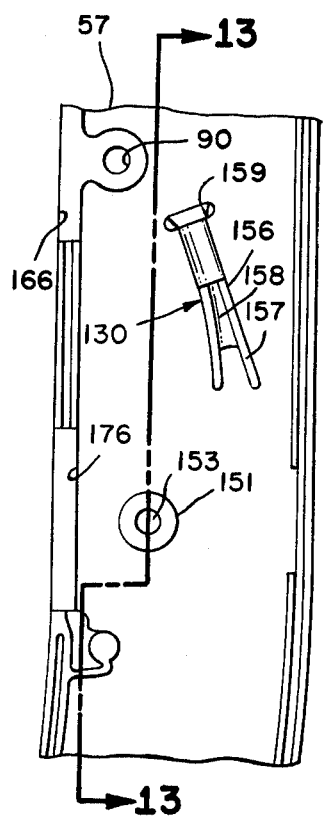
FIG. 10
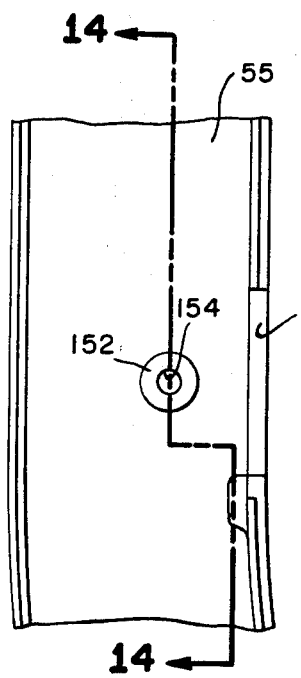
FIG. 11
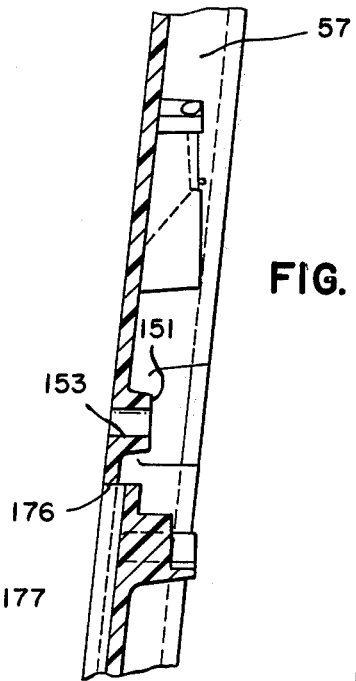
FIG. 12
FIG. 13
FIG. 14

BICYCLE STEERING AND CONTROL MEMBER

BACKGROUND OF THE INVENTION

It is believed that two wheeled machines propelled by pushing with the feet against the ground were used in Egypt over 3,000 years ago but it was not until 1816 that a German inventor, Baron Kaul von Drais of Karlsruhe mounted the front wheel so that it could be moved from side to side and provided a handle so that steering could be more or less controlled. The forerunner of the bicycle was known as the Draisine. Handlebars, first made of wood were later made of metal tubing but changed very little from the Draisine, through the high-wheeler of 1861 and the "safety" bicycle invented in 1876 with the low profile of today's bicycle. The most recent development of recent times is the racing bicycle with the "dropped" handlebars but the handlebars continue to be made from metal tubing, wrapped with tape to give some measure of comfort.

New materials and methods have resulted in some improvement, but the bicycle as a whole has remained essentially an assembly of parts made by different manufacturers, which have been perfected only in degree since the early 1900's. Until the 1920's automobiles were similarly constructed of many standard parts. It then came to be realized by Henry Ford and others that if each component were designed with the total vehicle in mind, much could be done to lower the cost and improve the quality of the auto. The design of the steering and control member which is the subject of this application is part of a completely new bicycle invented by Applicant which follows this same approach.

While plastics continue to be increasingly used in the automobile in many parts, plastics have found little use in bicycles outside of the pedals and hand grips, even though the lighter weight and lower cost of plastics would seem to favor their adoption in bicycles where each pound of the bicycle has to be propelled by the exertion of human energy.

Although cost is a major factor to many people of the world in the purchase and use of bicycles, little has been done to reduce the number of parts. Moreover, the use of many parts requires relatively heavy and expensive connectors and the expenditure of time and skill in adjusting the relative positions of the parts to one another.

A summary of the characteristics of present bicycle steering and control members follows. A comparison with the features of the present invention can be made on a paragraph by paragraph basis by referring to the numbered paragraphs under "Summary of the Invention".

PRESENT BICYCLES

1. Present handlebars with stem and control levers weigh about 2 pounds and are made of thin-walled steel tube.
2. Most handlebars have sufficient strength and rigidity to hold up well in all but the more violent of situations. The cables coming from the controls, however, make large loops, outside the handlebars which are often caught on other objects, resulting in accidents and damage.
3. Handlebars are adjusted for tilt and height. The shift levers are adjusted for drag. In addition, the handlebars must be rotated for alignment. This latter adjustment ability has no purpose. The drag on the shift levers is required because of the nature of the shifting system. The handlebar height adjustment is needed for rider comfort.
4. The simple construction of the handlebars requires that all control levers have their own housings and fastening means, with many parts resulting. Also, the shift levers have many components in the drag mechanism. Accidental disassembly of the latter results in a major reassembly task for the novice.
5. Steering is stable at all hand positions. The brakes are so located that they are inoperable or inefficiently operable from several of the hand positions commonly used. The hands must therefore be moved for braking just at a time when fast emergency braking and steering action might have to be made. The shift levers usually are located on the frame or stem, so one hand must leave the handlebars for shifting. A few bicycles have the shift levers on the tips of the handlebars. At this location the operating hand is still in contact with the handlebars, but at a less than perfect operational position.
6. Since the handlebars are made of round tube, and since in normal operation the arms are carrying some of the body's weight, the handlebars tend to dig into the palms of the hands. To prevent discomfort, the rider than shifts his hands from one position to another. Since the handlebars are made from one bent tube, large portions, including some hand positions, are within curved sections and therefore do not fit the hand well. Furthermore, the lower section or drop diverges from the upper section, so as the rider shifts from one position to another, the wrists are forced to rotate from the ideal perpendicular to some other position, resulting in greater discomfort.
7. The handlebars themselves are simple and cost little to make. In delivering the bicycle, however, the dealer usually has to adjust the position of the brake levers, then wrap the handlebars with tape for comfort. This then becomes a real preparation cost.

SUMMARY OF THE INVENTION

The gist of the present invention is the use of plastic parts, molded to meet the structural and functional requirements and designed to provide the most lightweight, comfortable, safe, low maintenance and cost effective steering and control carrying member for a bicycle.

A list of the advantages of the present invention follows:

THE ROBINSON BICYCLE

1. The Robinson steering and control member with stem and control levers weigh 1.7 pounds, for a savings of about 0.3 to 0.4 pounds over present handlebars and controls.
2. The Robinson cross bars are made of aluminum tubing and fiberglass moldings, with strength specifications similar to those of present handlebars. All control cables are contained within the steering member, with levers projecting from inside. There are no loops of cable to snag. The levers line up with the steering member, and are protected by them. The steering member and controls, therefore, can receive considerable abuse without damage.
3. The steering member is constructed for optimum tilt, with no adjustment possible. The height can be adjusted. The stem is extruded with a keyway, so the steering member cannot rotate out of alignment under any circumstances. Due to the construction of the shift system, the shift levers need no drag. No adjustment is provided or needed.

4. The steering member and stem is made from 7 parts. Each shift lever has four, and each brake lever has only two. Thus, total parts are minimized.

5. As with the present handlebars, steering is stable at all hand positions. There are two sets of brake levers, one for the main "up" position and one for the dropped position. The forward and cross-bar positions require movement of the hands. While not ideal, this improvement covers almost all of the situations where fast action might be required, since the two secondary positions are used mostly in hill climbing and in relaxed riding.

The shift levers are located midway between the upper and lower hand grips, and can be operated with minimal hand movement from either position. The handlebars are therefore substantially safer than the present ones.

6. The molded grips are shaped to fit the hand. The flat tops distribute the load evenly across the palm of the hand. The grips extend without bend for the full length of the hand. The upper and lower grips are slightly convergent, so that as the body rocks forward to the dropped position, the palms stay perpendicular to the arms. The hands, then, have no tendency to slide forward or backward.

7. The steering and control member is low in cost. Because of the nature of the molding process, there is no machining and simple assembly is all that is required. This applies also to the levers, since they are molded. There is no dealer preparation other than the quick assembly of the handlebars to the frame.

BRIEF DESCRIPTION OF THE DRAWINGS

FIG. 1 is a side view of the right hand-grip-control member.

FIG. 2 is a rear view of the steering and control member with the hand grip members in cross section taken along line 2—2 of FIG. 1.

FIG. 3 is an enlarged side view of the molded right outside member.

FIG. 4 is an enlarged side view of the molded right inside member.

FIG. 5 is a cross section of the lower hand grip member taken along lines 5—5 of FIG. 3 and FIG. 4.

FIG. 6 is an enlarged rear view of the molded right outside member.

FIG. 7 is an enlarged rear view of the molded right inside member.

FIG. 8 is an enlarged cross section of the assembled molded right inside and outside members taken along lines 8—8 of FIGS. 6 and 7.

FIG. 9 is an enlarged top plan view of the right hand-grip-control member.

FIG. 10 is a cross section of the molded right inside member taken along line 10—10 of FIG. 9.

FIG. 11 is an enlarged side view of a portion of the left outside control housing member.

FIG. 12 is an enlarged side view of a portion of the left inside control housing member which registers with the structure shown in FIG. 11.

FIG. 13 is a cross section taken along line 13—13 of FIG. 11.

FIG. 14 is a cross section taken along line 14—14 of FIG. 12.

FIG. 15 is an enlarged side view of a portion of the right shift cable boss taken along line 15—15 of FIG. 3.

FIG. 16 is a cross section of the cable boss taken along line 16—16 of FIG. 15.

FIG. 17 is an enlarged side view of the right shift cable holder which registers with the right shift cable boss of FIG. 3.

FIG. 18 is a cross sectional view of the cable holder taken along line 18—18 of FIG. 17.

FIG. 19 is a bottom plan view of the cable holder taken along line 19—19 of FIG. 18.

FIG. 20 is a cross section of the right upper hand grip member taken along line 20—20 of FIG. 4.

FIG. 21 is a side view of the brake cable holder constructed to register with the right brake cable boss shown in FIG. 4.

FIG. 22 is a cross section taken along line 22—22 of FIG. 21.

FIG. 23 is a bottom plan view taken along line 23—23 of FIG. 22.

FIG. 24 is a side view of the left shift cable holder constructed to register with the left shift cable boss shown in FIG. 11.

FIG. 25 is a cross sectional view taken along line 25—25 of FIG. 24.

FIG. 26 is a bottom plan taken along line 26—26 of FIG. 25.

FIG. 41 is a partial segment taken in the area of line 41—41 of FIG. 4 showing an alternate configuration of the stocket opening.

DESCRIPTION OF THE PREFERRED EMBODIMENTS OF THE INVENTION

Figure 28:
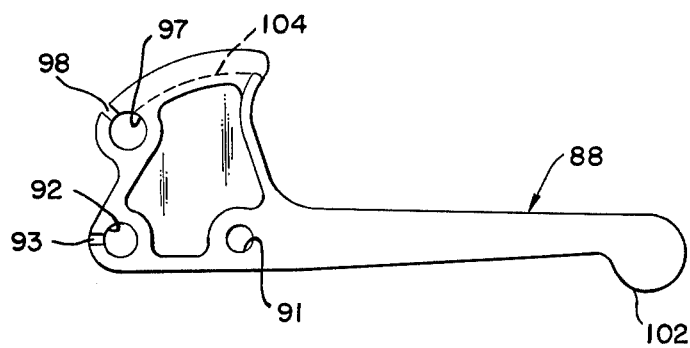
FIG. 28 is a side view of the upper brake lever.

The steering and control member of the present invention consists of a cross member 2 adapted for connection to a stem member 3 and a pair of hand-grip-control members 4 and 5 each formed from at least two molded inside members 7 and 8 and two molded outside members 9 and 10 joined to one another. The hand-grip-control members include upper hand grip members 12 and 13 connected to the cross member 2, lower hand grip members 14 and 15 spaced below the upper hand grip members and control housing members 17 and 18 connected to the upper and lower hand grip members. All elements are made from plastic such as 40% fiberglass filled polycarbonate LNP DF 1008 or equal except the cross member which is preferably drawn aluminum.

The steering and control member may be formed in many cross sectional shapes. Preferably the upper hand grip members are formed with hand grip portions 20, 21, 22, and 23 which have a flat or large radius areas 25, 26, 27 and 28 on the upper side of the upper grip area. The lower hand grip members are formed with hand grip portions 31, 32, 33, and 34 which also have flat or large radius areas 36, 37, 38, and 39 on the upper side of the grip area.

Preferably the molded inside and outside members are formed with thin cross sectional wall areas and are formed to create a hollow area when joined to one another. As shown in FIGS. 5 and 8 the ends 41 and 42 of wall 43 may be formed with grooves 45 and 46. Ends 48 and 49 of wall 50 are formed with tongues 52 and 53 which mate with grooves 45 and 46 in the other wall. The members are then held together by an adhesive or other bonding agent or method.

The steering and control member could be molded in various ways but the preferable way is shown in the drawings. The left outside member 9 includes left outside upper hand grip portion 20, left outside control housing portion 57, and left outside lower hand grip portion 31. The left inner member 7 includes left socket member 61, formed with key 66, left inner upper hand grip portion 21, left inner control housing portion 55, and left inner lower hand grip portion 34. The right inner member 8 includes right socket member 62, formed with key 66, right inner upper hand grip portion 22, right inner control housing portion 56 and right inner lower hand grip portion 33. The right outer member 10 includes right outer upper hand grip portion 23, right outer control housing portion 58 and right outer lower hand grip portion 34. Socket member 61 receives end 63 of cross member 2 and socket member 62 receives end 64 of the cross member. Keyway 65 in cross member 2 registers with keys 66 in the socket members.

Identical inside upper brake lever pivot means 67 are formed in the inside portions of the control housing members adjacent the upper hand grip members. As shown in FIGS. 4 and 7, the pivot means may be formed in the molded member and consist of a boss 68 with a circular opening 69.

Identical inside gear shift lever pivot means 71 may be formed in the control housing member adjacent and generally midway between the upper and lower hand grip members. The pivot means may consist of a boss 72 formed with an opening 73 therethrough.

Identical inside lower brake lever pivot means 75 are formed in the control housing adjacent the lower hand grip member. This may consist of an opening 76 in the inside members.

The molded outside members 9 and 10 as shown in FIGS. 3 and 6 include outside upper brake lever pivot means 77 formed in the control housing member. These may consist of a boss 78 with an opening 79 which registers with the inside upper brake lever pivot opening 69. Outside gear lever pivot means 81 are formed in the outside portions of the control housing members. These may consist of a boss member 82 formed with an opening 83 which registers with the inside gear lever pivot opening 73. An outside lower brake lever pivot means 85 is formed in the control housing in registration with the inside lower brake lever pivot means. This consists of an opening 86 formed in the outside hand-grip-control member.

The upper hand-brake levers 88 and 89 are pivotally mounted on the inside and outside upper brake lever pivot means. Upper left brake lever pivots in an opening 90 in the left outside portion of control housing 57. The brake lever is shown in detail in FIG. 28. Pivot opening 91 registers with pivot openings in the upper brake lever pivot means. Opening 92 and slot 93 receive end 94 of brake cable 95. Opening 97 is formed in the lever and opens to slot 98. End 99 of brake cable 100 is retained in opening 97. Right upper brake lever 89 pivots in openings 69 and 79 of right inside and outside portions of control housing member 18.

Enlargements 102 and 103 formed on the handles 88 and 89 help retain the operators fingers on the brake levers. Cable race 104 adjoins opening 97 and carries brake cable 100.

Figure 29:
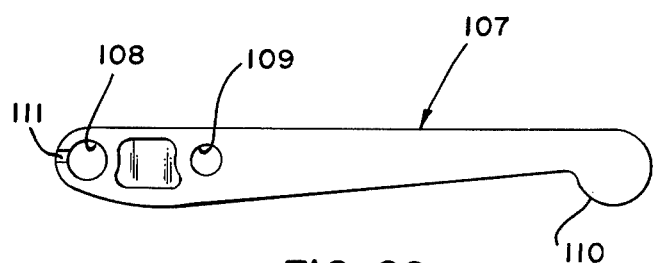
FIG. 29 is a side view of the lower brake lever.
Figure 30:
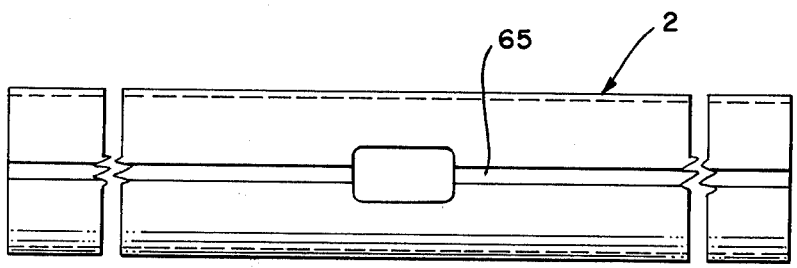
FIG. 30 is an enlarged side view of the cross member.
Figure 31:
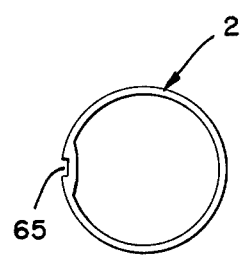
FIG. 31 is an end view of the cross member of FIG. 30.
Figure 39:
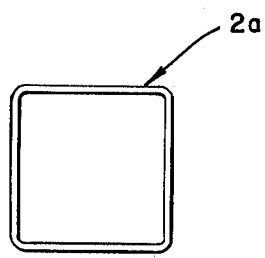
FIG. 39 is an end view of an alternate form of cross member.

Lower hand-brake levers 106 and 107 are pivotally mounted on the inside and outside lower brake lever pivot means. The lever is shown in detail in FIG. 29. Openings 108 and 109 are formed in handles 106 and 107. The distal ends are formed with shoulders 110 and 112 to aid in engagement by a finger. Slot 111 intersects opening 108. End 113 of cable 95 is held in opening 108.

Figure 27:
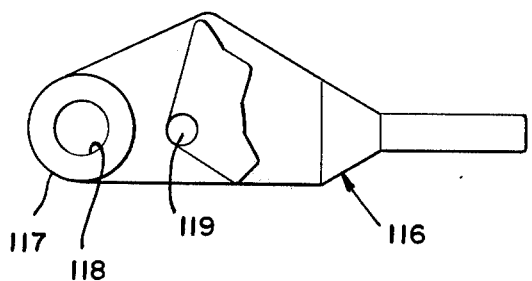
FIG. 27 is a side view of the shift lever.

The gear shift levers 115 and 116 are mounted on the inside and outside gear lever pivot means. A gear lever is shown in detail in FIG. 27. Boss 117 is formed in the end with opening 118 formed therethrough. A cable ending opening 119 is formed in the lever. End 141 of shift cable 142 is connected to opening 119 of shift lever 116.

Referring to FIGS. 4, 21, 22, and 23, brake cable holder means 21 are mounted within each of the hand-grip-control members for guiding brake cables within the hand-grip-control members. The brake cable holder means consists of a brake cable boss 123 formed with a depression 122, tapered inlet 124 and a tapered outlet 125. A brake cable holder 127 having tapered inlet depression 128 and tapered outlet depression 129 is connected to the brake cable boss 123.

Referring to FIGS. 3, 17, 18, and 19, gear shift cable holder means 131 is mounted within the hand-grip-control member. The cable means consists of a cable boss 132 formed with a tapered inlet depression 133, a mid depression 135 and a tapered outlet depression 134. The right shift cable holder includes a member 136 with a depression 137 which registers with the right shift cable boss. The right shift cable holder includes a tapered inlet depression 138 and a tapered outlet depression 139.

Details of the left gear pivot means and the left gear shift cable holder means are shown in FIGS. 11, 12, 13, 14, 24, 25 and 26.

Boss 151 and opening 153 are formed in the left outside portion of control housing member 57. Boss 152 and opening 154 are formed in the left inside portions of control housing member 55.

Gear shift cable holder means 130 is mounted within the hand-grip-control member. The cable holder means consists of a cable boss 156 formed with a tapered inlet depression 157, a mid depression 158 and a tapered outlet depression 59. The left shift cable holder includes a member 161 with a depression 162 which registers with the left cable boss. The left shift cable holder includes a tapered inlet depression 163 and a tapered outlet depression 164.

Left upper brake lever 88 is inserted into the left hand-grip-control member through a slot formed by inset opening 166 in the upper portion of the left outside portion of control housing member 57, and inset opening 167 in the upper left inside portion of control housing member 55.

Left lower brake lever 106 is inserted into the left hand-grip-control member through a slot formed by inset opening 171 and 172 in the lower left outside and inside portions of control housing members 57 and 55.

Right upper brake lever 89 is inserted into the right hand-grip-control member through a slot formed by inset openings 168 and 169 in the upper and outside portions of control housing members 56 and 58.

Right lower brake lever 107 is inserted into the right hand-grip-control member through a slot formed by inset openings 173 and 174 in the lower right inside and outside portions of control housing members 56 and 58.

Left gear lever 115 is inserted into the left hand-grip-control member through a slot formed by inset openings 176 and 177 formed in the left outside and inside control housing members 57 and 55.

Right gear lever 116 is inserted into the right hand-grip-control member through a slot formed by inset openings 178 and 179 formed in the right inside and outside control housing members 56 and 58.

As shown in FIGS. 1 and 7, the control housing members 17 and 18 are positioned to intersect the cross member 2 at an angle greater than 90° so that the lower hand grip members 14 and 15 are positioned transversely outwardly from the upper hand grip members 12 and 13. In effect the lower hand grip members diverge from the upper hand grip members so that when the rider shifts from one position to another, the wrists are not forced to rotate from the ideal perpendicular to some other position, resulting in greater discomfort.

Another feature of the present invention may be seen in FIGS. 1, 3 and 4. These drawings show that the upper hand grip members 12 and 13 and lower hand grip members 14 and 15 are positioned to intersect the control housing members 17 and 18 so that the upper and lower hand grip members converge with respect to one another. This angular relationship is important so that as the body rocks forward to the dropped position, the palms stay perpendicular to the arms. The hands, then, have no tendency to slide forward or backward.

Figure 32:
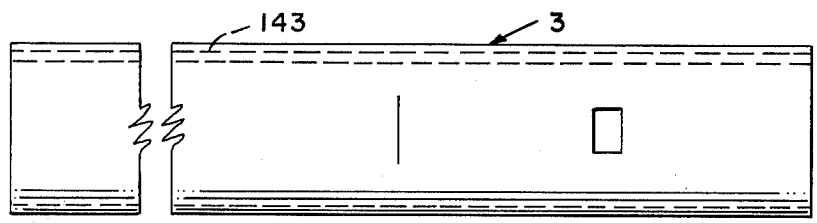
FIG. 32 is an enlarged side view of the stem tube.
Figure 33:
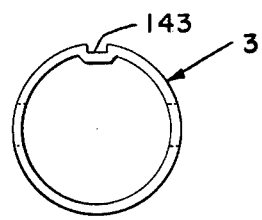
FIG. 33 is an enlarged end view of the stem tube.

FIGS. 32 and 33 illustrate the stem tube which is adapted for connection to a head bracket. The stem tube 3 is formed with a keyway 143 to eliminate the possibility of rotation which is present on standard bicycles.

Figure 34:
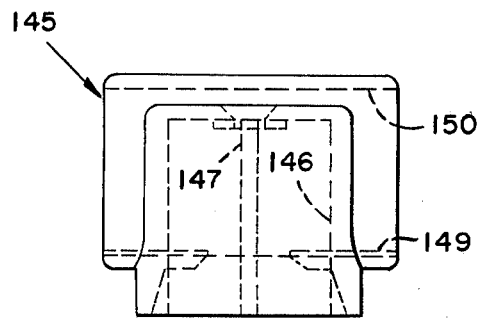
FIG. 34 is a rear elevation view of the stem bracket.
Figure 40:
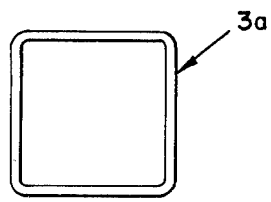
FIG. 40 is an end view of an alternate form of stem tube.
Figure 35:
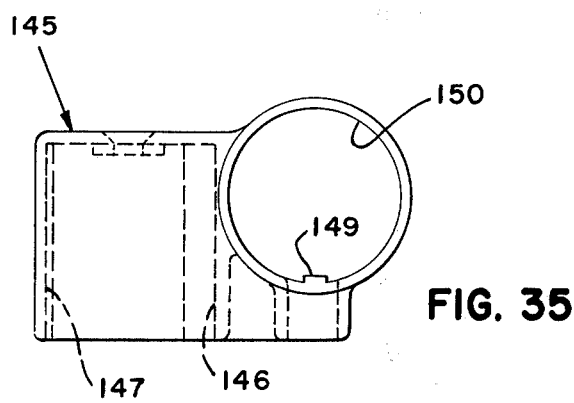
FIG. 35 is a side view of the stem bracket of FIG. 34.
Figure 36:
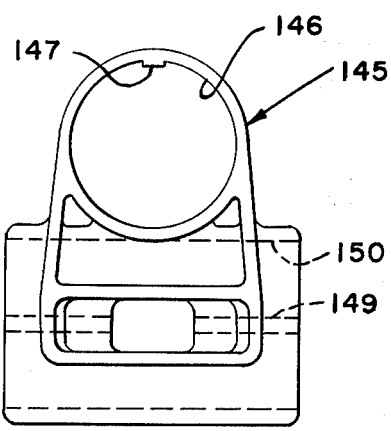
FIG. 36 is a bottom plan view of the stem bracket of FIGS. 34 and 35.

FIGS. 34-36 illustrate the stem bracket 145. The stem bracket is formed with a socket opening 146 for receiving the stem tube and the socket is formed with a key 147.

The cross member 2 is formed with a keyway 65 which registers with a key 149 formed in the socket opening 150 of the stem bracket.

Figure 37:
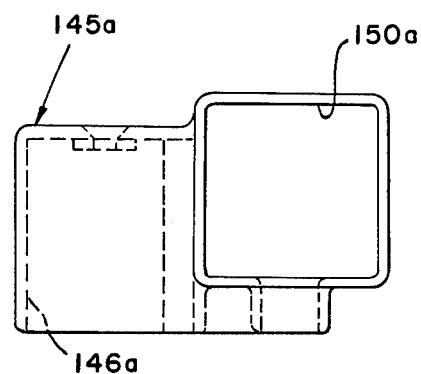
FIG. 37 is a side view of an alternate form of stem bracket.
Figure 38:
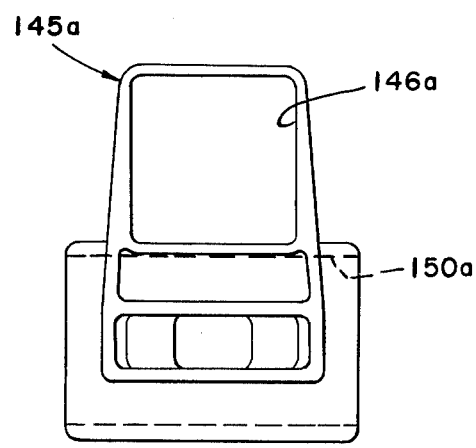
FIG. 38 is a bottom plan view of the stem bracket of FIG. 37.

An alternate construction is shown in FIGS. 37-41. Instead of forming the stem and cross members with a circular shape and providing protrusions and keyways to prevent relative movement, the tubes can be made in a non-circular configuration such as the square stem 3a shown in FIG. 40 which mates with squares stem bracket opening 146a as shown in FIG. 38.

In like manner, a cross member 2a may be formed with a non-circular configuration such as a square with rounded corners which mates with a square opening 60 in the socket members 61 and 62 as shown in FIG. 41. The stem bracket 145a as shown in FIGS. 37 and 38 may also be formed with a square opening 150a to receive non-circular cross member 2a of FIG. 39.

As shown in FIG. 1, the upper hand grip members 12 and 13 are longer than the lower hand grip members 14 and 15. This design permits the bicycle rider to lean further back and sit in a more comfortable and more upright position when touring. Even with the hands placed on the rear portion of the upper hand grip members, the brake levers 88 and 89 can still be reached with two fingers of each hand.

I claim:

1. A steering and control member for a bicycle comprising:
   a. a cross member (2) adapted for connection to a stem member (3); and
   b. a pair of hand-grip-control members (4) and (5) each formed from at least two molded inside members (7) and (8) and two outside members (9) and (10) joined to one another and said hand-grip-control member including:
      (1) upper hand grip members (12) and (13) connected to said cross member,
      (2) lower hand grip members (14) and (15) spaced below said upper hand grip members, and
      (3) control housing members (17) and (18) connected to said upper and lower hand grip members.

2. A steering and control member for a bicycle described in claim 1 comprising:
   a. said upper and lower hand grip members are formed with hand grip portions (20), (21), (22), (23), (31), (32), (33) and (34) having flat or large radius areas (25), (26), (27), (28), (36), (37), (38), and (39) on the upper side of said grip sections.

3. A steering and control member for a bicycle described in claim 1 comprising:
   a. a stem bracket (145) formed with an opening for receipt of said cross member (2) and a non-circular stem bracket opening positioned at right angles to said cross bar socket opening; and
   b. a stem member having a non-circular end for mating and non-turning receipt in said stem bracket opening.

4. A steering and control member for a bicycle described in claim 1 comprising:
   a. said upper hand grip members (12) and (13) are longer than said lower hand grip members (14) and (15).

5. A steering and control member for a bicycle described in claim 1 comprising:
   a. said control housing members (17) and (18) are positioned to intersect said cross member (2) at an angle greater than 90° so that said lower grip members are positioned transversely outwardly from said upper hand grip members.

6. A steering and control member for a bicycle described in claim 1 comprising:
   a. said upper hand grip members (12) and (13) and lower hand grip members (14) and (15) are positioned to intersect said control housing members (17) and (18) so that said upper and lower hand grip members converge with respect to one another.

7. A steering and control member for a bicycle described in claim 1 comprising:
   a. a stem tube (3) formed with a keyway (143) and adapted for connection to a head bracket;
   b. a stem bracket (145) formed with an opening (146) having a key (147) for receiving said stem tube in registration with said stem tube keyway (143) and formed also with a socket member opening (150) having a key (149) formed therein; and c. said cross member is formed with a keyway (66) registering with said key (149) formed in said socket member opening (150) of said stem bracket 8. A steering and control member for a bicycle described in claim 1 comprising:
   a. said molded inside and outside members are formed with thin cross sectional wall areas (43) and (50) and are formed to create a hollow area when joined to one another.

9. A steering and control member as described in claim 8 comprising:
   a. said inside members include left and right inside portions (55) and (56) of said control housing members, inside portions (21), (22), (32), and (33) of said upper and lower hand grip members, and socket members (61) and (62) formed with a key (66) for receiving an end of said cross member;
   b. said outside members include left and right outside portions (57) and (58) of said control housing members and outside portions (20), (23), (31) and (34) of said upper and lower hand grip members;
   c. inside upper brake lever pivot means (67) formed in said inside portions of said control housing members adjacent said upper hand-grip member;
   d. inside gear shift lever pivot means (71) formed in said inside portions of said control housing member adjacent and generally midway beween said upper and lower hand grip members;
   e. inside lower brake lever pivot means (75) formed in said inside portions of said control housing members adjacent said lower hand grip member;
   f. outside upper brake lever pivot means (77) formed in said outside portions of said control housing members registering with said inside upper brake lever pivot means (67);
   g. outside gear lever pivot means (81) formed in said outside portions of said control housing members registering with said inside gear lever pivot means;
   h. outside lower brake lever pivot means (85) formed in said outside portion of said control housing in registration with said inside lower brake lever pivot means;
   i. upper hand brake levers (88) and (89) pivotally mounted on said inside and outside upper brake lever pivot means;
   j. lower hand brake levers (106) and (107) pivotally mounted on said inside and outside lower brake lever pivot means; and
   k. gear shift levers (115) and (116) pivotally mounted on said inside and outside gear lever pivot means.

10. A steering and control member for a bicycle described in claim 1 comprising:
    a. said hand-grip-control members (4) and (5) are each formed with socket members (61) and (62) formed with non-circular openings; and
    b. said cross member (2) is formed with non-round ends for mating and non-turning receipt in said socket openings.

11. A steering and control member for a bicycle described in claim 10 comprising:
    a. brake cable holder means (121) mounted within said hand-grip-control members for guiding brake cables within said hand-grip-control members; and
    b. gear shift cable holders means (130) and (131) mounted within said hand-grip-control members for guiding gear shift cables within said hand-grip-control members.

* * * * *